Dec. 4, 1928.
C. L. SNYDER
HEAD BLOCK STRAP ATTACHMENT
Filed Feb. 2, 1928
1,694,287
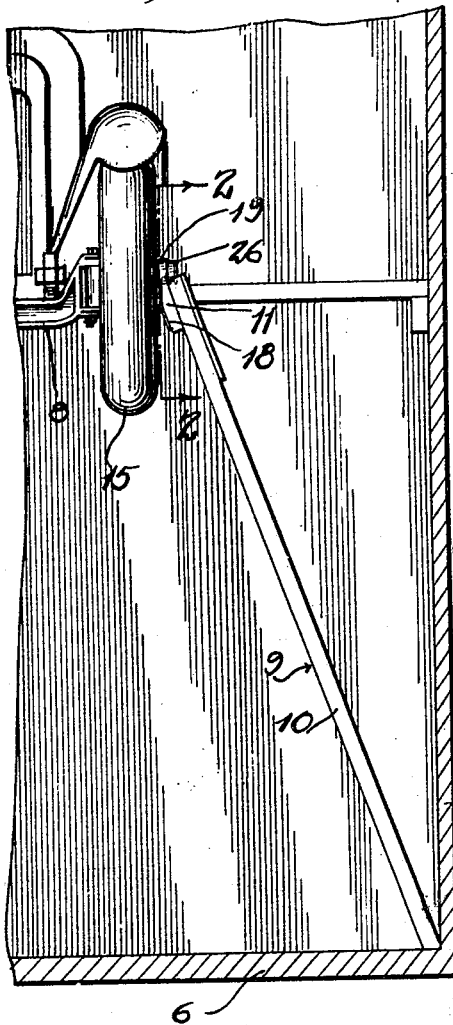
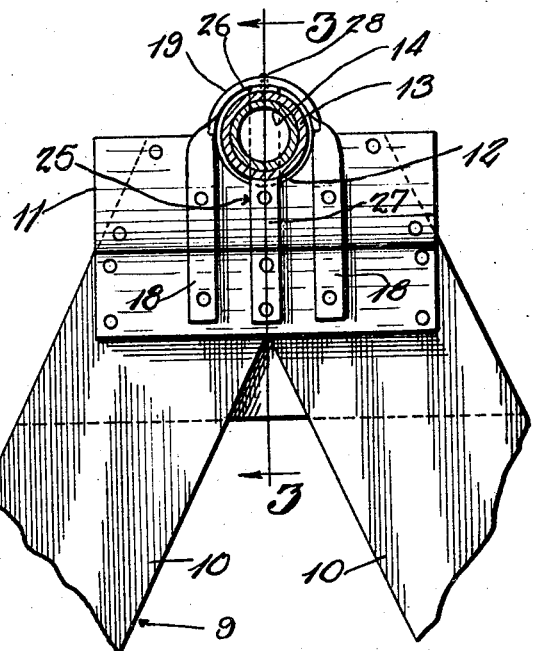
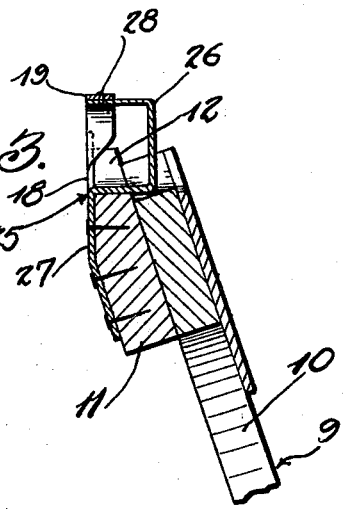
INVENTOR.
Clifford L. Snyder.
BY
ATTORNEY.

Patented Dec. 4, 1928.

1,694,287

UNITED STATES PATENT OFFICE.

CLIFFORD L. SNYDER, OF DETROIT, MICHIGAN, ASSIGNOR TO THE EVANS AUTO LOADING CO. INC., OF DETROIT, MICHIGAN.

HEADBLOCK-STRAP ATTACHMENT.

Application filed February 2, 1928. Serial No. 251,419.

This invention relates to decks for supporting automobiles in an elevated position within freight cars and the like for the purpose of shipment, and has more particular reference to a useful attachment for the head block strap of decks of this kind.

While the present invention is capable of use with head block straps of ordinary form, it is especially serviceable when used in connection with the form of head block strap shown and described in the pending application of C. F. Rumely, filed February 4th, 1928, Serial Number 251,936. While the improved head block strap disclosed in the said application will eliminate troubles arising through loose fastening of the automobile hub in the head block of the deck, there is a further source of trouble arising from the chafing of the wheel spokes or disk by the head block of the deck. This chafing of the wheel is often serious enough to require the refininshing of the wheel parts after the automobile arrives at its destination.

The primary object of the present invention, therefore, is to provide a buffer or top strap adapted to be attached to the hub-anchoring head block strap of an automobile shipping deck, said buffer or stop strap engaging the wheel hub to prevent the head block of the deck from moving inwardly into contact with and rubbing against the wheel so as to mar the finish of the latter.

A further object is to provide a buffer strap of the above kind which is simple in construction, efficient in use, and capable of ready attachment to the head block strap.

A still further object is to provide a combined head block and buffer strap which may be economically manufactured and conviently placed into practical use.

The invention consists in the novel form, combination and arrangement of parts hereinafter more fully described, shown in the accompanying drawing and claimed.

In the drawing:

Figure 1 is a fragmentary transverse sectional view of a freight car having an automobile supported in an elevated position therein by means of a plurality of decks, one of the decks being shown and having a head block strap and buffer strap embodying the present invention, applied thereto;

Figure 2 is an enlarged fragmentary vertical section on line 2—2 of Figure 1; and Figure 3 is a vertical section on line 3—3 of Figure 2.

Referring more in detail to the drawing, 5 indicates a freight car having a floor 6 and side walls 7 and within which an automobile 8 is supported in an elevated position by means of a plurality of decks, one of which is shown at 9. These decks may be of any well known or preferred construction, but as illustrated, each consists of a pair of upwardly converging supporting legs 10 having their upper ends rigidly secured together and in engagement with one another by suitable means including a head block 11. The head block 11 has a circular notch or seat 12 formed in the upper edge thereof for snug reception of the lower portion of the shipping hub cap 13 used upon the hub 14 of the automobile wheel 15. A head block strap is employed for anchoring or holding the wheel hub within the seat 12 of the head block 11, and as shown, this strap includes apertured end portions 18 adapted to be flatly nailed against the inner face of the head block 11 and an intermediate portion 19 passed over and curved to fit the upper portion of the wheel hub for firmly holding or anchoring the latter in the seat 12 of the head block 11. The intermediate portion 19 is disposed at right angles to the end portions 18 for flat engagement with the wheel hub, and it preferably projects laterally and outwardly of the end portions 18 so as to overlie the seat 12 and provide a firm purchase on the wheel hub as well as to permit proper seating of the hub in the head block without engaging and chafing the wheel.

The present invention consists of a buffer or stop strap 25 attached to the head block strap and arranged and formed to engage the wheel hub, or its shipping cap when the latter is used, for holding the head block 11 outwardly in spaced relation to the spokes or disk of the wheel 15, whereby said head block is prevented from moving inwardly into contact with and working against the wheel spokes or disk to mar the finish thereof. This buffer strap consists of a strip of metal formed to provide a semi-inverted U-shaped upper end portion 26 and a depending lower attaching end portion 27 adapted to be nailed to the inner face of the head block 11 as shown in Figures 2 and 3. The free upper end of the buffer strap is fastened to the center of the intermediate head block strap portion 19 as at 28, by soldering, riveting, welding or the like, the U-shaped portion 26 of the buffer strap projecting laterally and outwardly from the head block strap with the lower leg of the portion 26 disposed at the bottom or lower central portion of the seat 12. The vertical depth of the U-shaped portion 26 is such as to snugly admit the wheel hub or its shipping hub cap, but is of a horizontal depth somewhat less than the length of the wheel hub or its hub cap so that the vertical intermediate member of the U-shaped portion 26 is disposed to engage the outer end of the hub or its hub cap and effectively hold the deck head 11 outwardly away from the spokes or disk of the automobile wheel and thereby prevent chafing of the same.

In practice, the buffer or stop strap 25 will be assembled with the head block strap in the process of manufacture, and the combination head block and buffer strap will be placed in position and securely nailed to the head block 11 while the deck is being assembled.

In view of the above, it will be seen that the present invention provides a simple and efficient means for preventing the deck head from marring the wheel spokes or disk. It will also be seen that the weight of the car is carried on the head block which is placed on the inner side of the deck, or the side toward the wheel. This placing of the head block is superior to the placing of the deck head at the outer side of the deck as previously used, wherein the deck head seat was formed by a dado cut. Still further, the strap assembly embodying this invention will be economical to manufacture and considerably cheaper than the steel heads previously used to prevent chafing.

Minor changes may be made without departing from the spirit and scope of the invention as claimed.

What I claim as new is:—

1. The combination with a strap for anchoring a wheel hub in the seat of the head block of an automobile shipping deck, of means carried by said strap for engaging the wheel hub to hold the head block away from the wheel.

2. The combination with an automobile shipping deck embodying supporting legs and a head block secured to the inner sides of the upper ends of said legs and formed with a seat to receive the lower portion of a wheel hub, of a strap for anchoring the wheel hub in said seat embodying a curved intermediate portion fitted over the upper portion of the hub and end portions secured to the inner face of the head block, and a buffer strap attached at its upper end to the intermediate portion of the anchoring strap and having its lower end portion secured to the inner face of the head block, said buffer strap having a U-shaped upper end portion adapted to snugly receive the wheel hub and to engage the outer end of the latter to hold the head block out of contact with the wheel.

3. The combination with a strap for anchoring a wheel hub in the seat of the head block of an automobile shipping deck, of means carried by said strap for engaging the wheel hub to hold the head block away from the wheel, said means embodying a buffer strap attached to the anchoring strap and adapted to be secured to the head block.

4. The combination with a strap for anchoring a wheel hub in the seat of the head block of an automobile shipping deck, of means carried by said strap for engaging the wheel hub to hold the head block away from the wheel, said means embodying a buffer strap attached to the anchoring strap and adapted to be secured to the head block, said buffer strap having an upper end portion shaped to form a hub-receiving pocket of a depth less than the length of the hub.

5. The combination with a strap for anchoring a wheel hub in the seat of the head block of an automobile shipping deck, of means carried by said strap for engaging the wheel hub to hold the head block away from the wheel, said means embodying a strap attached to the anchoring strap and shaped to provide a hub receiving pocket.

6. The combination with a member adapted for attachment to the head of an automobile shipping deck to engage and anchor a wheel hub in the seat of said head, of means carried by said anchoring member for engaging the hub to hold the head out of contact with the wheel.

In testimony whereof I affix my signature.

CLIFFORD L. SNYDER.